United States Patent
Thiers et al.

(10) Patent No.: US 8,356,452 B2
(45) Date of Patent: Jan. 22, 2013

(54) FLOOR PANEL AND METHOD FOR THE MANUFACTURE THEREOF

(75) Inventors: Bernard Paul Joseph Thiers, Oostrozebeke (BE); Peter Jozef Hochepied, Izegem (BE)

(73) Assignee: Unilin Beheer B.V. Besloten Vennootschap, Nieuwerkerk A/D Ijssel (NL)

( * ) Notice: Subject to any disclaimer, the term of this patent is extended or adjusted under 35 U.S.C. 154(b) by 0 days.

(21) Appl. No.: 13/534,061

(22) Filed: Jun. 27, 2012

(65) Prior Publication Data

US 2012/0260486 A1   Oct. 18, 2012

Related U.S. Application Data

(63) Continuation of application No. 13/339,987, filed on Dec. 29, 2011, now Pat. No. 8,234,829, and a continuation of application No. 10/216,821, filed on Aug. 13, 2002, now Pat. No. 8,196,366.

(30) Foreign Application Priority Data

Aug. 14, 2001  (BE) .................................. 2001/0547

(51) Int. Cl.
   *E04F 15/22* (2006.01)
(52) U.S. Cl. ......................... 52/403.1; 52/408
(58) Field of Classification Search ................. 52/403.1, 52/390, 408
   See application file for complete search history.

(56) References Cited

U.S. PATENT DOCUMENTS

| | | | |
|---|---|---|---|
| 3,084,403 A | 4/1963 | Elmendorf | |
| 4,101,704 A | 7/1978 | Hiles | |
| 5,103,614 A | 4/1992 | Kawaguchi et al. | |
| 5,540,025 A | 7/1996 | Takehara et al. | |
| 5,691,037 A | 11/1997 | McCutcheon et al. | |
| 6,029,416 A | 2/2000 | Andersson | |
| 6,212,838 B1 * | 4/2001 | Eda | 52/403.1 |
| 6,397,547 B1 | 6/2002 | Martensson | |
| 6,526,704 B1 | 3/2003 | Berard et al. | |
| 6,536,178 B1 | 3/2003 | Palsson et al. | |
| 6,644,435 B2 | 11/2003 | Elasser | |

FOREIGN PATENT DOCUMENTS

| | | |
|---|---|---|
| DE | 2 205 232 | 8/1973 |
| DE | 79 11 983 | 8/1979 |
| DE | 43 13 037 C1 | 8/1994 |
| DE | 196 20 227 A1 | 11/1997 |
| DE | 197 38 731 A1 | 3/1999 |
| DE | 201 09 321 U1 | 10/2002 |
| EP | 0 692 423 A1 | 5/1995 |
| EP | 1 113 123 A1 | 12/1999 |
| EP | 1 113 122 A1 | 12/2000 |
| EP | 1 264 946 A1 | 6/2001 |
| JP | 4111853 | 4/1992 |
| JP | 07180333 | 7/1995 |
| JP | 09-088315 | 3/1997 |
| JP | 2001-329681 | 11/2001 |
| WO | 99/00242 | 1/1999 |

OTHER PUBLICATIONS

Konishi Toshiyuki et al., Patent Abstract of Japan Publication No. 07300979, Publication date Nov. 14, 1995.*

* cited by examiner

*Primary Examiner* — Basil Katcheves
(74) *Attorney, Agent, or Firm* — Bacon & Thomas, PLLC

(57) ABSTRACT

Floor panel of the type comprising a hard top layer forming a decorative surface, from which, together with other identical or similar floor panels, a floor covering can be formed, wherein this floor panel includes at least one sound-absorbing layer which is integrated into the floor panel and is located between other layers of this floor panel.

15 Claims, 4 Drawing Sheets

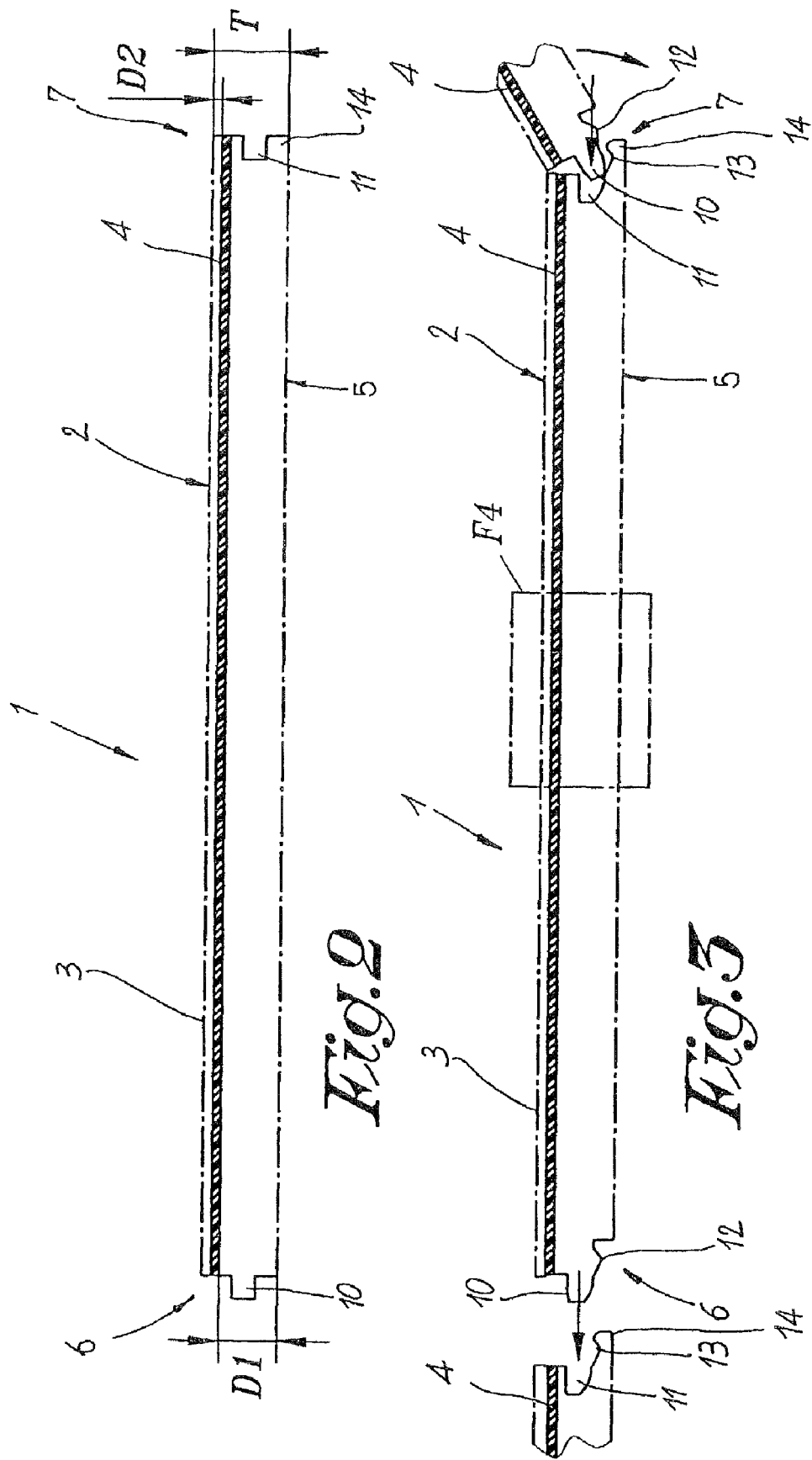

es realized such that an optimization or at least a considerable improvement of the sound absorption is provided, notwithstanding the presence of the hard or relatively hard surface to be walked on.

FLOOR PANEL AND METHOD FOR THE MANUFACTURE THEREOF

CROSS REFERENCE TO RELATED APPLICATIONS

This application is a continuation of U.S. application Ser. No. 13/339,987 filed Dec. 29, 2011, which is a continuation of U.S. application Ser. No. 10/216,821 filed Aug. 13, 2002, and claims priority to Belgian application no. 2001/0547 filed Aug. 14, 2001. The contents of the priority application are incorporated by reference herein in their entirety.

BACKGROUND OF THE INVENTION

A. Field of the Invention

This invention relates to a floor panel and a method for the manufacture thereof.

B. Discussion of Related Art

More particularly, the invention relates to a floor panel of the type comprising a hard top layer forming a decorative surface, from which, together with other identical or similar floor panels (1), a floor covering can be formed.

In particular, the invention relates to so-called laminated floor panels, such as, for example, described in the international patent application No. WO 97/47934.

By a floor panel with a hard top layer, any form of panel has to be understood which has a hard or relatively hard surface at the side which is to be walked upon, which feature does not exclude that softer materials are incorporated in the panel, nor excludes that the panel can show a certain flexibility.

The floor panels of this type known up to now have the disadvantage that, when walked upon, they are causing a kind of "clacking" sound. In particular the higher tones forming the basis of this sound are experienced as annoying.

It is known to provide an insulating layer loosely under such floor panels, either in the form of a foil, or in the form of insulating panels, whereby the thus formed insulating layer in particular serves as a thermal insulation, however, simultaneously also has some sound-absorbing effect, in particular in downward direction. However, the sound-absorbing effect of an insulating layer provided under the floor panels seems to be rather small, in particular if one intends to reduce reflection sounds, more particularly the so-called "footfall sound".

Also, it is already known to attach an insulating, more particularly thermally insulating, layer in a fixed manner against the underside of the floor panels, which of course offers the advantage that such layer is realized under the floor panels simultaneously with the installation of the floor panels themselves, however, moreover to a large extent is comparable to a separate insulating layer provided beforehand under the floor panels.

Also, it is already known to provide floor panels with a cork covering at the upper side, whereby the top surface thereof whether or not is finished by means of a layer of lacquer, such as transparent varnish or the like, and whereby it is intended, by installing the floor panels, to form a cork floor. In such embodiment, little sound is produced when walking thereon, which is evident, as one will be walking directly on the relatively soft cork. The disadvantage of such floor panels, however, consists in that the appearance of the decorative surface remains limited to the appearance of cork or printed cork, as a consequence of which the usage possibilities are strongly limited.

The present invention aims at a floor panel of the above-mentioned type, in other words, a floor panel comprising a hard top layer forming a decorative surface, which floor panel

SUMMARY OF THE INVENTION

To this aim, the invention relates to a floor panel of the type comprising a hard top layer forming a decorative surface, from which, together with other identical or similar floor panels (1), a floor covering can be formed, with as a characteristic that this floor panel comprises at least one sound-absorbing layer which is integrated into the floor panel itself and, to this aim, is located between other layers of this floor panel, in other words, is incorporated into the structural construction of the panel and is not simply provided as a covering against the underside of the floor panel.

By integrating one or more sound-absorbing layers into the floor panel, more particularly at a distance above the underside, as well as at a distance below the top surface, it is obtained that, on one hand, such soundabsorbing layer, independent from the thickness of the floor panel, can be positioned relatively close to the upper surface, whereas, on the other hand, the global structure of such floor panel still can be kept relatively thick and stable. Tests have shown that by integrating the sound-absorbing layer, better results are obtained, on one hand, as the thickness of the material situated thereabove, in which the sound substantially propagates, is reduced and, on the other hand, in that a multilayer construction is created, which obviously also contributes to the desired effect in an advantageous manner.

Also, by integrating the sound-absorbing layer into the floor panel, the possibility is created to keep, at choice at the upper side and/or the underside of the floor panel, material which can be optimally chosen in function of the desired purposes, independent from the choice of material for the sound-absorbing layer.

Preferably, said sound-absorbing layer, viewed according to the thickness of the floor panel, at least extends up into the upper half of this panel. Still more particularly, the sound-absorbing layer will be entirely situated in the upper half. Thereby, a relatively thick and consequently stable basic structure can be maintained under the sound-absorbing layer, whereas the sound-absorbing layer is situated close to the top surface, which contributes to an optimum sound absorption. As a relatively thick basic structure can be maintained, it is not necessary to deviate from standard thicknesses of 1 cm or less for the floor panels, and it is even possible to apply the invention while keeping the traditional thicknesses of the floor panels of 7 to 8 mm, or even thinner.

Preferably, the sound-absorbing layer, or if there are several thereof, the upper sound-absorbing layer, is situated with its upper side at a distance below the upper side of the floor panel which is smaller than 4 mm, and even better is smaller than or equal to 2 mm. As a result thereof, a particularly good sound absorption is obtained, whereas it still remains possible to realize a sufficiently solid top surface with a sufficient bearing capacity and impact resistance.

According to another preferred characteristic, the floor panel comprises only one sound-absorbing layer integrated between other layers, as a consequence of which the constructive design of such floor panel remains relatively simple. Moreover, thereby it can be achieved that, by realizing this sole sound-absorbing layer as thin as possible, a relatively large thickness remains which is available for one or more structural basic layers, for example, basic layers giving global strength to the floor panel, such as layers formed of wood-based board material, more particularly MDF (Medium Density Fiberboard) and/or HDF (High Density Fiberboard).

Preferably, the floor panel, apart from the soundabsorbing layer and the top layer, then also at least comprises one structural basic layer. Although various structural basic layers can be incorporated into the floor panel, this latter, according to an important preferred form of embodiment, will comprise only one structural basic layer, which contributes to the constructive simplicity of the whole.

In a particularly preferred form of embodiment, the top layer is attached directly on top of the sound-absorbing layer, more particularly without the intermediary of structural basic layers. Therefore, the material thickness above the sound-absorbing layer is minimum, which contributes to a good sound absorption, as the propagation of sound in the upper layer is impeded. Still more particularly, it is preferred that below the structure formed by the sound-absorbing layer with the top layer directly attached thereon, at least one structural basic layer is present. In this manner, a floor panel with a stable base is obtained, whereby, however, simultaneously a good sound absorption is created.

In the most preferred form of embodiment, the construction even is such that the floor panel, with the exception of possible adhesive layers or the like, and with the exception of an insulating layer possibly provided at the underside of the floor panel, exclusively consists of the structural basic layer, the soundabsorbing layer provided on top thereof, and the top layer provided on top of this sound-absorbing layer.

According to another form of embodiment of the present invention, at least one additional layer of material, preferably a structural basic layer, is present between the sound-absorbing layer and the top layer, which allows that to this aim, a material can be chosen which forms an optimum sublayer for the applied top layer, for example, which allows to function as a support for a decorative layer, when such decorative layer, for example, is such that it can not be directly attached onto the applied sound-absorbing material. Such additional layer, which, in a practical embodiment, can consist of wood-based board material, such as particle board or fiberboard, more particularly MDF and/or HDF, for example allows to provide the floor panel trouble-free with a decorative top layer, formed by so-called DPL (Direct Pressure Laminate). With DPL, one or several sheets of material impregnated with resin, amongst which a printed decorative layer made of paper, are directly compressed onto the underlying layer, whereby simultaneously heat is supplied, such that an adherence is obtained automatically. As in the above-said construction, the DLP is pressed upon the HDF, MDF or the like, in other words, onto one and the same material surface as in traditional floor panels, the same adhesive quality and stability can be achieved, without the necessity of special precautions.

The preceding, however, does not prevent the application of a top layer according to the DPL principle directly on the sound-absorbing layer, when the material thereof allows this, which may be determined by tests.

According to another form of embodiment of the present invention, the sound-absorbing layer is located between two structural basic layers. As a consequence, a floor panel is obtained which can be processed and/or coated in a traditional manner at the upper side as well as at the underside thereof, for example, can be coated, as aforementioned, by DPL, either preceding to composing the layer structure of which the floor panels then consist, or after such composing.

As already mentioned in the aforegoing in respect to several forms of embodiment, it can be stated in general that it is preferred to use board material consisting of wood or being wood-based for the aforementioned structural basic layers, more particularly pressed plates which are formed of wood-comprising material, for example, wood parts, such as chips or fibers, which are mixed with a binding agent.

In particular, for one or more of the structural basic layers, use is made of plate material formed by MDF and/or HDF. Still more particularly, all structural basic layers applied in the floor panel shall consist of MDF and/or HDF.

The use of such wood-based structural basic layers offers the advantage to enable the manufacture of the panels in an economic manner, as well as the application of traditional processing methods and tools.

Moreover, MDF and HDF, and in general similar fiberboards, too, provide a fiber structure with fibers which are substantially situated in a horizontal plane, which is particularly advantageous for the strength of the finished product. As, according to the invention, a sound-absorbing layer is integrated into the floor panels, the remaining thickness for structural basic layers mostly is rather restricted. By using boards with a fiber structure, the fibers of which substantially are situated in the horizontal plane, the strength, however, remains guaranteed, even if these structural basic layers have become rather thin.

The floor panel may be provided with one or more backing layers, which in particular are intended to offer a counterbalance against warping. In a practical form of embodiment, such backing layer is provided at least at the underside of the floor panel, in order to offer a balance for the top layer situated at the upper side of the floor panel.

Also, covering layers and/or backing layers can be incorporated into the floor panel at other locations, which layers preferably are situated at the upper side and/or underside of structural basic layers which form part of the respective floor panel. In this manner, per structural basic layer a balancing effect can be provided for, without having other layers exerting an influence thereupon.

In a preferred form of embodiment, the floor panels are provided with coupling parts at two or more of their edges. In a simple form of embodiment, these coupling parts may consist of a traditional tongue and groove. More particularly, however, use shall be made of coupling parts of the tyke providing for a vertical, as well as horizontal locking, for example, as described in the international patent application WO 97/47934.

Although it is not excluded that such coupling parts, more particularly the tongue-shaped part thereof, as well as possibly the walls of the groove-shaped part thereof, are formed entirely out of the material of the soundabsorbing layer, it is preferred that these coupling parts are formed at least partially of one or more of said structural basic layers. This, in fact, offers the advantage that the coupling parts still have the same qualities in respect to strength, flexibility and the like, as this is the case with floor panels with a traditional construction.

Regardless whether the coupling parts are manufactured from the material of a structural basic layer of from another material, it is always preferred that these coupling parts are situated substantially, and preferably entirely, outside of the sound-absorbing layer or layers, in other words, that these coupling parts and the sound-absorbing material, viewed in the height, are situated at different levels in the floor panels. This offers the advantage that, when, as described in the following, the sound-absorbing layer or layers are realized in a material which offers little strength and/or are realized in a material which is difficult to process, the strength of the coupling parts and/or the degree of difficulty of forming them is not or only minimally influenced in a disadvantageous manner due to the presence of the soundabsorbing layer. This latter is in particular valid for embodiments in which the sound-absorbing layer consists of synthetic material and in which the coupling parts are formed by means of a milling process. Milling in the synthetic material indeed may cause problems in respect to cooling, and preferably, the cutting surface through the synthetic material thus will be restricted to a minimum, which, as aforementioned, is possible by situating the coupling parts to be formed outside of the sound-absorbing layer.

More particularly, the sound-absorbing layer or layers are situated above the coupling parts. In this manner, such layer can be situated close to the upper surface, and therefore the sound insulation remains maximum.

The sound-absorbing layer can consist of various materials. Particularly good results, in respect to absorption as well as in respect to processability, are obtained by applying cork or a cork-based material.

Cork also offers the advantage that the final floor panels still are easy to recycle, such contrary to embodiments in which the sound-absorbing layer consists of synthetic material.

Other advantages of cork are the following:
it is a relatively inexpensive product, as it is a natural product;
cork is waterproof, as a result of which a water repelling effect is created, in particular if it is provided above a material layer, such as MDF or HDF, which is sensitive in respect to water;
cork is a product which is easy to process and which offers the advantage that the applied tools less rapidly show wear and tear than, for example, when processing synthetic material;
cork is relatively easy to glue, as well as easy to print, which allows that a number of treatments can be realized without any problem, such as, for example, the glueing of the cork to the other layers, or printing the cork when, as will be explained in the following, a bevelled part or so-called chamfer, which is provided with a coating or such, is realized at the floor panels.

Cork also is particularly recommended for being applied as a sound-absorbing layer directly under the top layer, as in this manner a good adherence of the top layer can be guaranteed. Also, vibrations, amongst which sound vibrations, are absorbed almost immediately in the cork.

According to another practical form of embodiment, use will be made of a sound-absorbing synthetic material, preferably polyurethane.

According to a particular characteristic, the sound-absorbing layer is formed of a material layer which can be wound up in itself, to which aim, for example, a thin layer of cork or a thin layer of synthetic material can be applied. Such windable material offers the advantage that it is easy to utilize in a production process, in particular in a continuous process, whereby the soundabsorbing layer systematically must be provided on and/or between plate-shaped structural basic layers. The soundabsorbing material then can be unwound systematically onto the underlying structural basic layer and can be attached thereto.

In general, it is preferred that the sound-absorbing layer has a thickness of less than 2 mm, such in order to keep a relatively large thickness for other layers, for example, for said structural basic layers. In most applications, moreover a more economical product will be obtained, as the material for forming the structural basic layers, for example, MDF and/or HDF, mostly is cheaper than the material for the sound-absorbing layer.

Also the thickness of said top layer preferably is limited, more particularly to less than 1 mm.

The top layer preferably is realized according to any of the following possibilities:
as a laminate layer constructed of material sheets, more particularly a so-called "laminated sheet material;
veneer or the like.

The laminate layer constructed of material sheets may be of different kind Preferably, to this aim use will be made of HPL (High Pressure Laminate) or the like, which, as known, consists of different layers of resin or layers formed by supports, such as lengths of paper, which are impregnated with resin, which layers are compressed to a whole and are cured. Also, so-called formica or the like can be applied. According to another variant, one may also start from "compact laminate" as a top layer, which then, instead of being applied as such, is fixed upon underlying layers, which layers, in accordance with the invention, comprise at least one sound-absorbing layer. Further, also the use of DPL (Direct Pressure Laminate) or LPL (Low Pressure Laminate) or the like is not excluded, in any case if the layer situated below the top layer allows this. The top layer also may be reinforced, for example, by means of a reinforcement fleece or such, it may comprise a wear and tear-resistant upper layer, and so on.

In the case that the top layer is fixed directly on top of the sound-absorbing layer, and in particular if this sound-absorbing layer is somewhat compressible, for example, when it consists of cork, it is preferred that a relatively strong laminate layer constructed in layers is used, such as the aforementioned HPL or formica. The necessary thickness of the top layer to be used therewith can be determined empirically by means of strength tests, whereby it is tested whether, for example, in function of the thickness of the top layer sufficient impact resistance, resistance against perforations and such is obtained.

Particularly good results in respect to sound absorption, as well as in respect to the general composition, are obtained with a structure composed of, successively from the bottom to the top, a structural basic layer formed by a plate-shaped wood-based material, more particularly MDF/HDF, a sound-absorbing layer formed by cork, and a top layer formed from HPL or the like.

According to a particular form of embodiment, the sound-absorbing layer will be integrated into the top layer, which, of course, is possible in different ways. So, for example, this can be realized by taking up a particularly thin cork layer, when forming the HPL or the like, between two of the material layers of which the HPL is formed.

It is noted that said cork can be applied pure or mixed with other material, for example, as a filling agent present in other materials.

Finally, the invention also relates to a method for manufacturing a floor panel, more particularly a floor panel with an integrated sound-absorbing layer. To this end, it provides for a method, whereby first, composed plates of a larger size are manufactured, from which subsequently each time several floor panels are formed, characterized in that said plates are manufactured at least by supplying one or more board-shaped structural basic layers, supplying material, wound up in rolls, for forming said sound-absorbing layer, and unwinding this material from those rolls, as well as supplying the top layer or the material for forming such top layer, whereby the respective composed layers are provided on top of each other.

As, according to this method, use is made of a windable sound-absorbing material, this latter is easy to handle in a production process, as then, the sound-absorbing material easily can be unwound and subsequently be attached upon the plate-shaped structural basic layers. Also, it possibly may be directly fixed upon such basic layer by rolling it thereon, by the intermediary of an adhesive agent, adhesive layer or the like.

It is clear that the different layers of the floor panels of the invention can be attached to each other in any manner. This may be performed, for example, by means of appropriate kinds of-glue or other adhesive materials, by having certain layers cure on top of each other or by fixing them upon each other by melting, or by providing thin double sided adhesive layers in between them.

When mentioning a "direct" attachment of the top layer on an underlying layer, this does not exclude that thin layers are present in between, by which then, for example, adhesive layers, fleeces, foils and the like are intended which do not have a considerable thickness.

It is clear that floor panels in which materials in the form of an integrated layer are applied, providing for a distinct sound-absorbing effect, even if those materials are integrated into such floor panel in the first place for other purposes, also are within the scope of the invention.

BRIEF DESCRIPTION OF THE DRAWINGS

With the intention of better showing the characteristics of the invention, hereafter, as an example without any limitative character, several preferred forms of embodiment are described, with reference to the accompanying drawings, wherein:

FIG. 2 represents a cross-section according to line I-II in FIG. 1;

FIG. 3 represents another embodiment of the floor panel according to the invention;

DETAILED DESCRIPTION OF PREFERRED EMBODIMENTS OF THE INVENTION

Figure 1:
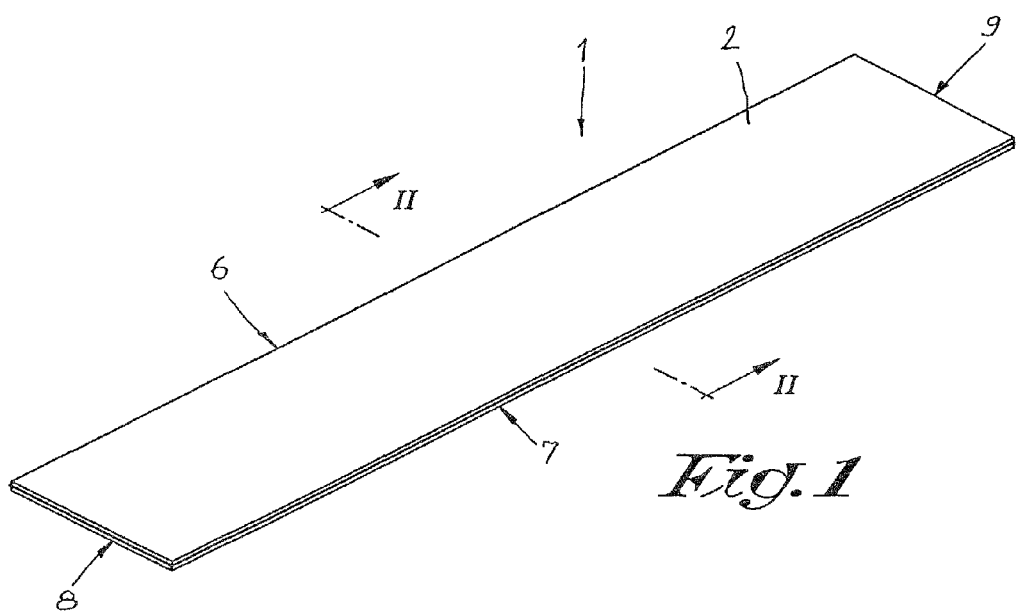
FIG. 1 represents a floor panel according to the invention.

As represented in FIGS. 1 and 2, the invention relates to a floor panel 1 which is provided with a hard or relatively hard top layer 3 at the upper side 2.

As schematically represented in FIG. 2, this floor panel 1 according to the invention comprises at least one sound-absorbing layer 4 which is integrated into the floor panel 1 itself, in other words, is incorporated into the structure of the floor panel 1.

Viewed according to the thickness T of the floor panel 1, as represented, the sound-absorbing layer 4 thus is situated at a distance D1 above the underside 5 of the floor panel 1, as well as at a distance D2 below the upper side 2.

As explained in the introduction, the distance D2 preferably is as small as possible, and in a practical application, this distance thus will be smaller than 4 mm, or even better, will be smaller than or equal to 2 mm.

As represented in FIG. 2, the floor panel 1, in a known manner, can be provided with coupling parts 10-11 at two or more of its edges, 6-7 and/or 8-9, respectively, which coupling parts in this case consist of a classical tongue and groove.

Of course, other forms of coupling parts 10-i1 can be applied, for example, of the type which, as represented in FIG. 3, in coupled condition provides for a mechanical locking, in vertical as well as in horizontal directions, whereby the coupling, for example, is performed by shifting the floor panels 1 in mutual respect towards each other, as illustrated at the left hand side of FIG. 3, and/or by turning them into each other, as illustrated at the right hand side of FIG. 3.

FIGS. 2 and 3 show that, when the floor panels 1 are equipped with such coupling parts 10-11, the sound-absorbing layer 4 preferably is situated outside of these coupling parts 10-11, with which it is meant that this layer 4 is not situated at the level of the tongue-shaped and groove-shaped parts formed by these coupling parts 10-11. In this manner, it is guaranteed that the sound-absorbing layer 4, in the proximity of the edges 6-7 and/or 8-9 provided with coupling parts 10-11, during the formation of the profile of these edges, is cut through exclusively vertical or substantially vertical. Hereby, the advantage is obtained that, as explained in the introduction, the strength of the coupling parts 10-11, and in particular the strength of the tongue-shaped parts, is not disadvantageously affected by the presence of the material of the sound-absorbing layer 4. Also, the distance over which the applied machinery tools must cut through the material of the sound-absorbing layer 4, thereby is restricted to a minimum.

As further represented in FIGS. 2 and 3, the sound-absorbing layer 4 preferably is situated above the coupling parts 10-11. This is particularly important in the embodiment of FIG. 3, in other words, where coupling parts 10-11 are applied whereby the mechanical locking in horizontal direction is obtained by means of locking parts 12-13, at the underside of the tongue-shaped coupling part 10 and the upper side of the lip 14 situated at the underside of the groove-shaped coupling part 11, respectively. As the sound-absorbing layer 4 is situated above the coupling parts 10-11, it is impossible that the strength of the lowermost part of the floor panel 1, and thus also of the lip 14 which must be sufficiently strong in order to allow such locking, is disadvantageously affected by the presence of the sound-absorbing layer 4, regardless of the strength of the material of which the layer 4 is manufactured.

Apart from the sound-absorbing layer 4, the floor panels 1 can be constructed from several layers in different manners. In consideration of the fact that this construction may differ, in FIGS. 2 and 3 the floor panels 1 thus are represented only schematically. This, however, does not exclude that certain compositions are preferred, for example, the compositions as described in the following by means of FIGS. 4 to 9.

Figure 4:
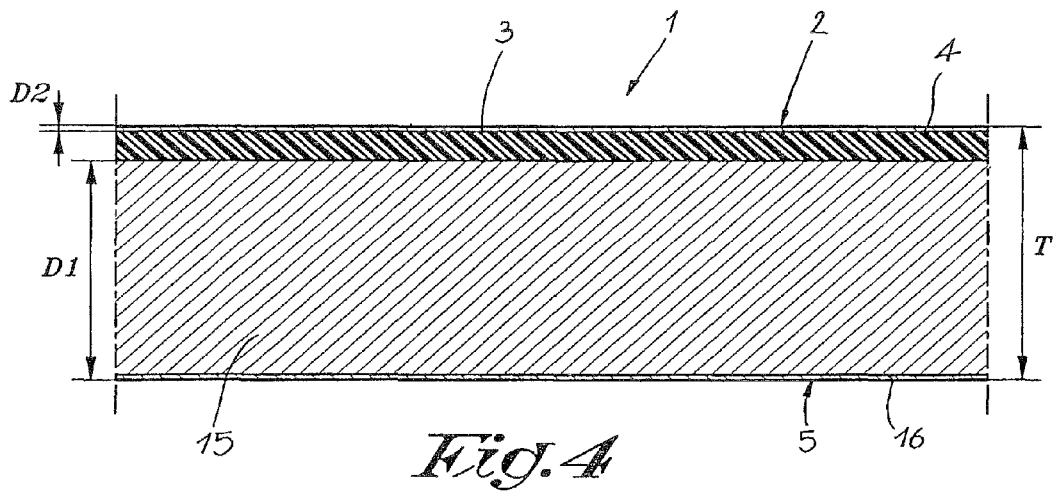
FIG. 4, at a larger scale, represents a possible embodiment of the part indicated by F4 in FIG. 3.

In FIG. 4, a particularly important form of embodiment of the invention is represented, whereby the top layer 3 is provided directly on the sound-absorbing layer 4 integrated in the floor panel 1, without the presence of a structural material layer in between. Thereby, the distance D2 is reduced to a strict minimum, to wit to the thickness or approximately the thickness of the top layer 3, with the advantage that the propagation of soundwaves is rendered particularly difficult.

In the example of FIG. 4, one structural basic layer 15 is provided below the sound-absorbing layer 4. Further, at the underside of this basic layer 15, a backing layer 16 is provided, which, on one hand, forms a protection, however, on the other hand, also is intended to create a balancing effect in respect to the top layer 3. More particularly, the purpose of the backing layer 16 is to counteract the possible warping of the floor panels 1 as a result of forces occurring between the top layer 3 and the respective layer upon which this top layer 3 is provided.

However, it is clear that the construction below the sound-absorbing layer 4 also can be of another kind.

In a practical form of embodiment of the example of FIG. 4, the basic layer 15 consists of a board based upon a wood product, more particularly a composed wood product, such as fiberboard, preferably MDF (Medium Density Fiberboard) or HDF (High Density Fiberboard), whereas the sound-absorbing layer 4 consists of cork. In this form of embodiment, the top layer 3 preferably consists of a so-called "laminated sheet material", more particularly HPL (High Pressure Laminate), the thickness of which is chosen such that a sufficiently strong support surface at the upper side of the floor panel 1 is obtained. This thickness can be empirically determined and possibly also can be chosen in function of the hardness of the sound-absorbing layer 4.

The backing layer 16 can be constructed in a similar manner as the top layer 3, however, with the difference that a decorative surface is formed at the top layer 3, for example, in that in the layer structure of the top layer 3, a printed decorative layer is provided, whereas this is not necessary at the backing layer 16. The decorative surface at the top layer 3 can be of different kind and, for example, may comprise an illustration forming an imitation of parquetry or wood.

Preferably, the different layers are provided on top of each other by means of an appropriate adhesive, to which end, for example, adhesives can be used which usually are applied for attaching HPL and the like upon a sublayer.

FIG. 4 only is a schematic representation, and of course, the relations between the thicknesses of the different layers can be chosen different. In a practical application, the basic layer 15, for example, will have a thickness of approximately 5 mm, whereas the sound-absorbing layer 4 has a thickness of 2 mm and the top layer 3 has a thickness of 1 mm. Of course, according to different variants, values can be applied which totally deviate from the abovesaid.

Figure 5:
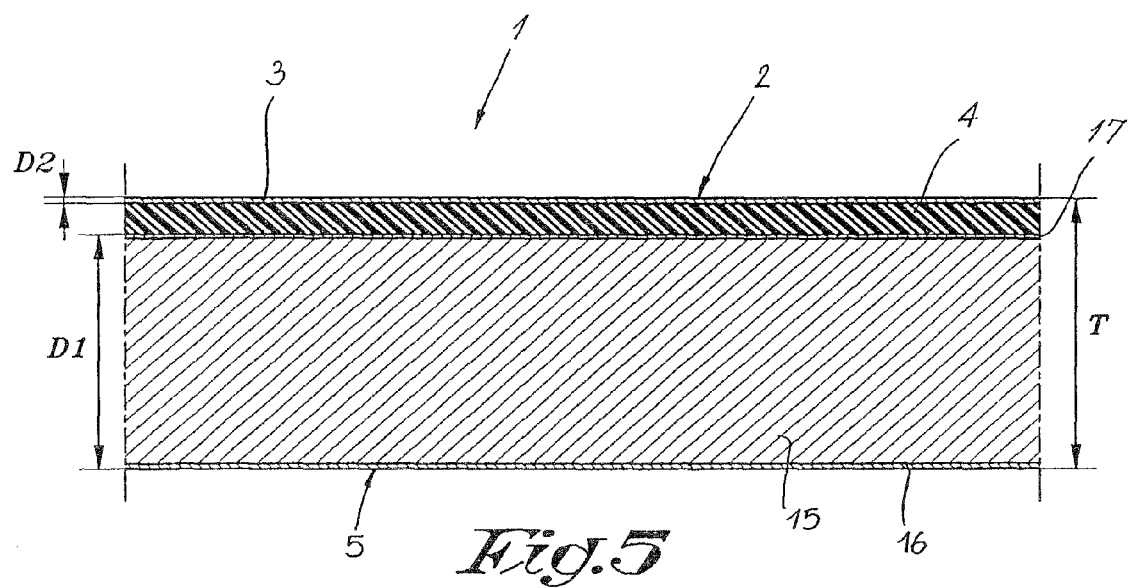
FIGS. 5 to 8 represent views analogous to that of FIG. 4, however, for four variants.

FIG. 5 shows a part of a floor panel 1 with a construction which can be compared to that of the floor panel 1 of FIG. 4, with the sole difference that an additional covering layer i8 is provided between the sound-absorbing layer 4 and the basic layer 15, on the upper side of the basic layer 15. Of course, this layer construction, too, can be realized in different manners. One possibility consists, for example, in that first the basic layer 15 is provided with the covering layer 17 and the backing layer 16, by means of classic DPL techniques (Direct Pressure Laminate), after which, by means of adhesives, the sound-absorbing layer 4 and the top layer 3 are attached thereupon.

According to FIGS. 6 and 7, the floor panels 1, apart from the sound-absorbing layer 4, substantially comprise two structural basic layers, more particularly the represented layers 18 and 19, which are situated above and below the sound-absorbing layer 4. At least one, and preferably both, of these basic layers 18 and 19 preferably consist of wood or a wood-based material, more particularly MDF and/or HDF.

Figure 6:
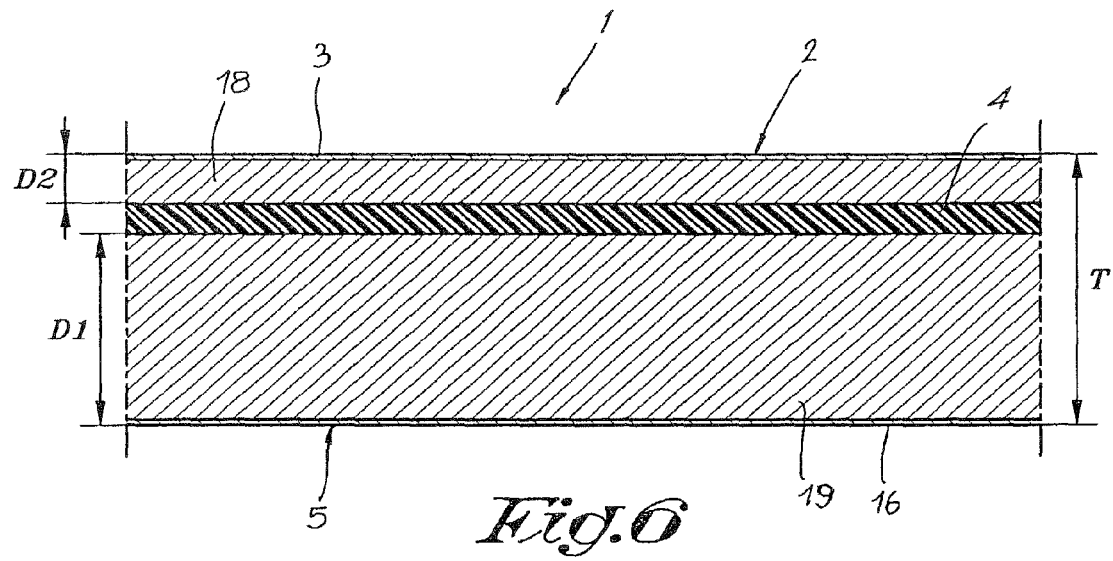
Figure 7:
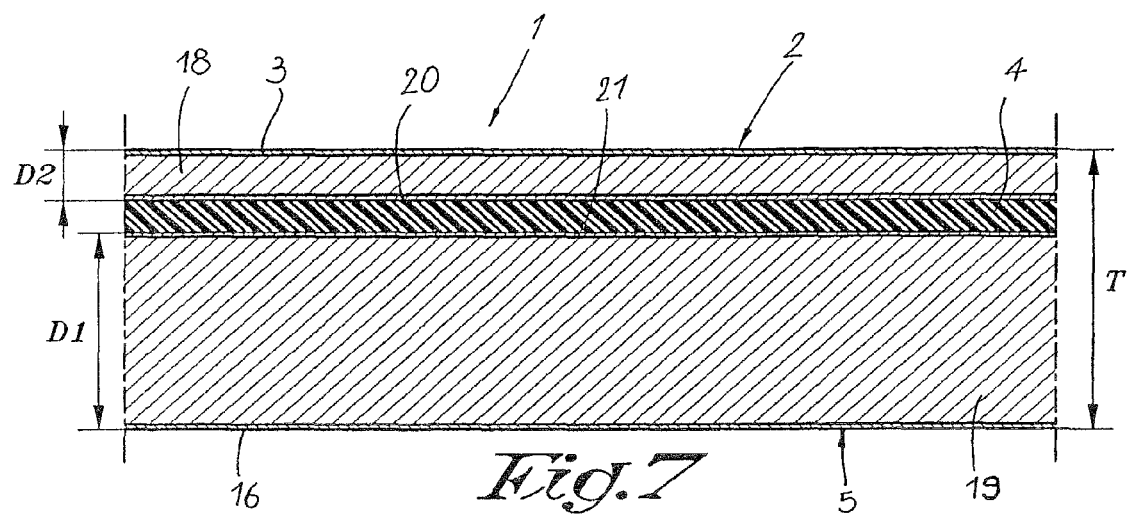

The embodiments of the FIGS. 6 and 7 offer the advantage that the outermost layers, in other words, the top layer 3 and the backing layer 16, do not have to be fixed directly on the sound-absorbing layer 4, as a result of which, on one hand, the material of the sound-absorbing layer 4 can be chosen in an optimum manner in function of the intended sound absorption, whereas the materials of the basic layers 18 and 19 can be chosen optimally in respect to the technique which preferably will be used for adhering the top layer 3 and the backing layer 16 to the basic layers 18 and 19.

The form of embodiment of FIG. 7 further differs from that of FIG. 6 in that at the underside of the basic layer 18, a backing layer 20 is provided, whereas at the upper side of the basic layer 19, a covering layer 21 is provided. In such case, for example, it is perfectly possible to realize all the layers 3-16-20-21 as DPL, whereas the basic layers 118 and 19 consist of wood-based plate material, more particularly MDF or HDF.

In general, it is clear that the application of covering layers and/or backing layers in particular is favourable in combination with structural basic layers consisting of materials traditionally applied for laminated floors, whereby in first instance thus MDF and/or HDF are intended. However, the use of such covering layers and/or backing layers is not always necessary.

Figure 8:
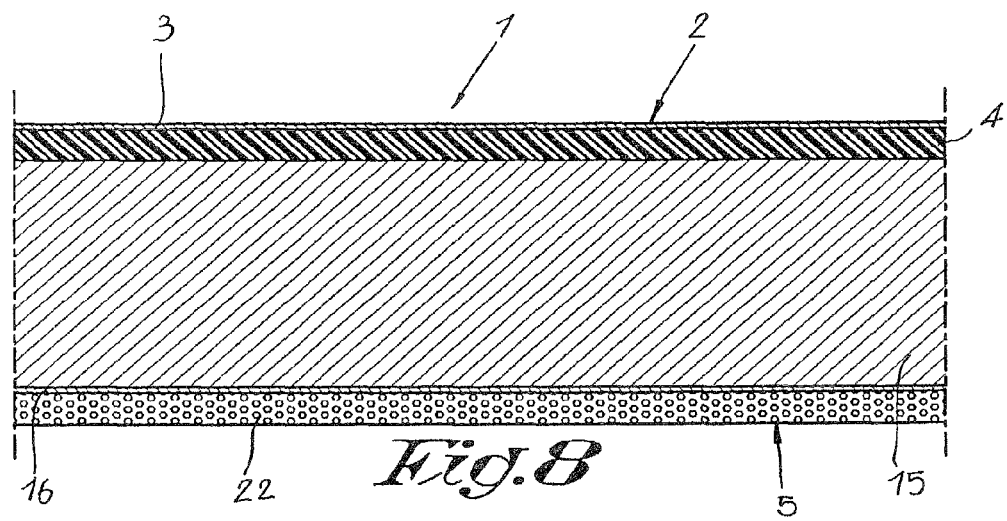

FIG. 8 shows a part of a floor panel 1 with a similar structure as that from FIG. 4, however, with the difference that at the underside of the floor panel 1, an additional layer 22 is provided which is formed by a compressible material, whether or not with thermal or sound-insulating features, which offers the advantages that during installation, unevennesses are levelled. This layer 22 consists, for example, of synthetic foam.

Figure 9:
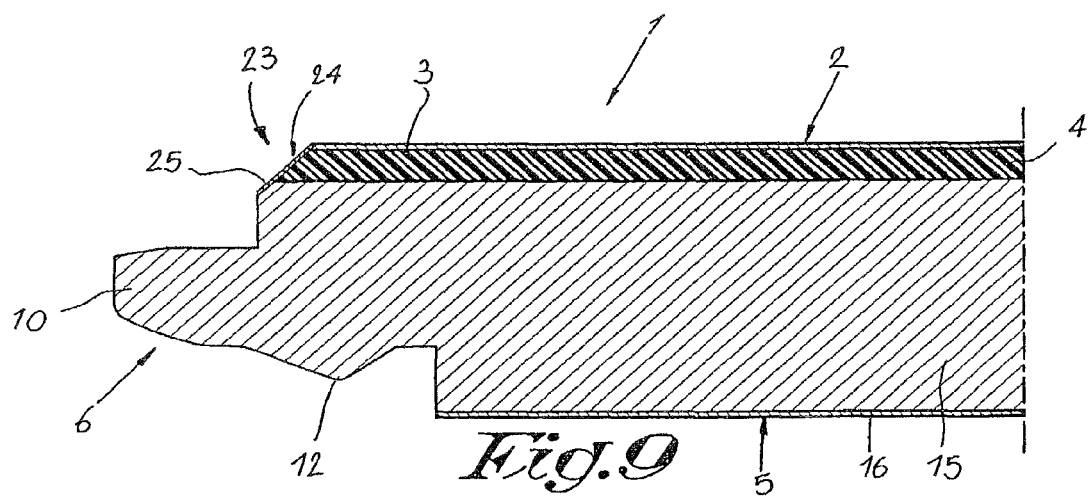
FIG. 9 in cross-section represents a part of another variant.

In FIG. 9, another variant is represented whereby the floor panel 1, at one or more of its upper edges 23, is provided with a bevelled part 24 or the like, more particularly a so-called chamfer, whereby the bevelled part at least partially extends through the soundabsorbing layer 4. In order to prevent that the layer structure becomes visible in an annoying manner, a decorative covering 25 is provided on the bevelled part. The covering 25 consists, for example, of a print obtained by means of transfer print, for example, as described in the international patent application PCT/BEO1/00008, or another printing technique. Also, a covering strip, lacquer or the like can be provided on the bevelled part.

According to a not-represented variant to the embodiment of FIG. 9, the thickness of the layer 4 is chosen such that the bevelled part 24 exclusively extends through the top layer 3 and the sound-absorbing layer 4 and not through the lower-situated layer or layers. This offers the advantage that the sound-absorbing layer 4, in any case if the latter is water-repellent, for example, consists of synthetic material or cork, also at the location of the bevelled part 24 forms a total protection against moisture penetration from the upper side towards the underlying layers, for example, the basic layer 15.

In combination with such bevelled part 24, preferably cork will be used for the sound-absorbing layer 4, as this can easily be printed on by, for example, said transfer printing.

Of course, such bevelled part 24 also can be applied in all other forms of embodiment.

Although in the figures only embodiments with one sound-absorbing layer 4 are represented, it is clear that according to variants, also several sound-absorbing layers 4 can be integrated in such floor panel 1. Also the structural basic layers 15-18-19 in their turn can be composed of several layers, whether or not provided with more or less covering layers or backing layers.

The mutual attachments of the different layers can be realized, as aforementioned, in any manner.

According to a particular technique, one or more layers can be applied which will melt by heating them at their upper surface and which, by subsequently bringing them together with other layers, can be adhered to these latter.

The sound-absorbing material can be of different kind. In general, hereby a material has to be understood which shows considerably better sound-absorbing qualities than the structural basic layers, such as MDF and HDF, which traditionally are applied in such floor panels.

Although the layer situated below the sound-absorbing layer 4 preferably is a structural basic layer, and consequently mostly consists of a layer which does not show any particular sound-absorbing characteristics, it is not excluded to provide, according to a variant, a sound-absorbing layer, whether or not consisting of the same material, under the sound-absorbing layer 4 integrated according to the invention, for example, instead of a structural basic layer.

The present invention is in no way limited to the forms of embodiment described as an example and represented in the figures, on the contrary, such floor panels, as well as the aforementioned method, can be realized according to different variants, without leaving the scope of the invention.

The invention claimed is:

1. A Method for manufacturing a floor panel, wherein said floor panel is composed of a plurality of layers, said plurality of layers comprising one or more basic layers, a top layer forming a decorative surface and a panel top side and at least a sound-absorbing layer integrated into the floor panel and located between other layers of the floor panel; said sound-absorbing layer being a compressible, vibration absorbing material; said method comprising the steps of:
providing said one or more basic layers;
providing said sound-absorbing layer;
manufacturing a composed plate of a size larger than said floor panel at least by providing at least said one or more basic layers and said sound-absorbing layer on top of each other and by mutually attaching at least said one or more basic layers and said sound-absorbing layer; wherein at least one of said basic layers being situated below said sound-absorbing layer;
providing said top layer forming said decorative surface above said sound-absorbing layer, such that the sound-absorbing layer is located between said top layer and said basic layer;
subsequently forming several floor panels from said composed plates;
subsequently forming mechanical coupling parts at one or more edges of said floor panels; said mechanical coupling parts enabling vertical as well as horizontal locking between coupled similar panels;
wherein said attaching involves fixing one or more of said sound-absorbing layer and said basic layers upon each other by melting one or more of said sound-absorbing layer and said basic layers by heating the one or more layers into a molten state at their upper surface and, subsequently bringing them together and adhering them with other layers.

2. The method of claim 1, wherein said attaching involves curing one or more of said sound-absorbing layer and said basic layers on top of each other.

3. The method of claim 1, wherein said providing said sound-absorbing layer involves unwinding said sound-absorbing layer form a roll.

4. The method of claim 1, wherein said providing said one or more basic layers involves supplying one or more board-shaped structural basic layers.

5. The method of claim 1, wherein said forming mechanical coupling parts involves cutting through said sound-absorbing layer.

6. The method of claim 1, wherein said method comprises providing a backing layer offering counterbalance against warping and wherein said floor panel comprises said backing layer at the underside.

7. The method of claim 1, wherein said method comprises providing a reinforcement fleece.

8. The method of claim 1, wherein said providing top layer forming said decorative surface involves printing said sound-absorbing layer.

9. The method of claim 1, wherein said sound-absorbing layer is chosen from the list consisting of cork, polyurethane and synthetic material other than polyurethane.

10. The method of claim 1, wherein said one or more basic layers are chosen from the list consisting of polyurethane, synthetic material other than polyurethane.

11. The method of claim 1, wherein said providing said sound-absorbing layers involves a continuous process, whereby said sound-absorbing material is systematically provided on and/or between said one or more basic layers.

12. The method of claim 1, wherein said floor panels are thinner than 7 millimeter.

13. The method of claim 1, wherein said mechanical coupling parts are mainly formed in said sound-absorbing layer.

14. The method of claim 1, wherein said mechanical coupling parts are mainly formed outside of said sound-absorbing layer.

15. The method of claim 1, wherein the material of said one or more basic layers is the same as the material of said sound-absorbing layer.

* * * * *